Patented Dec. 25, 1945

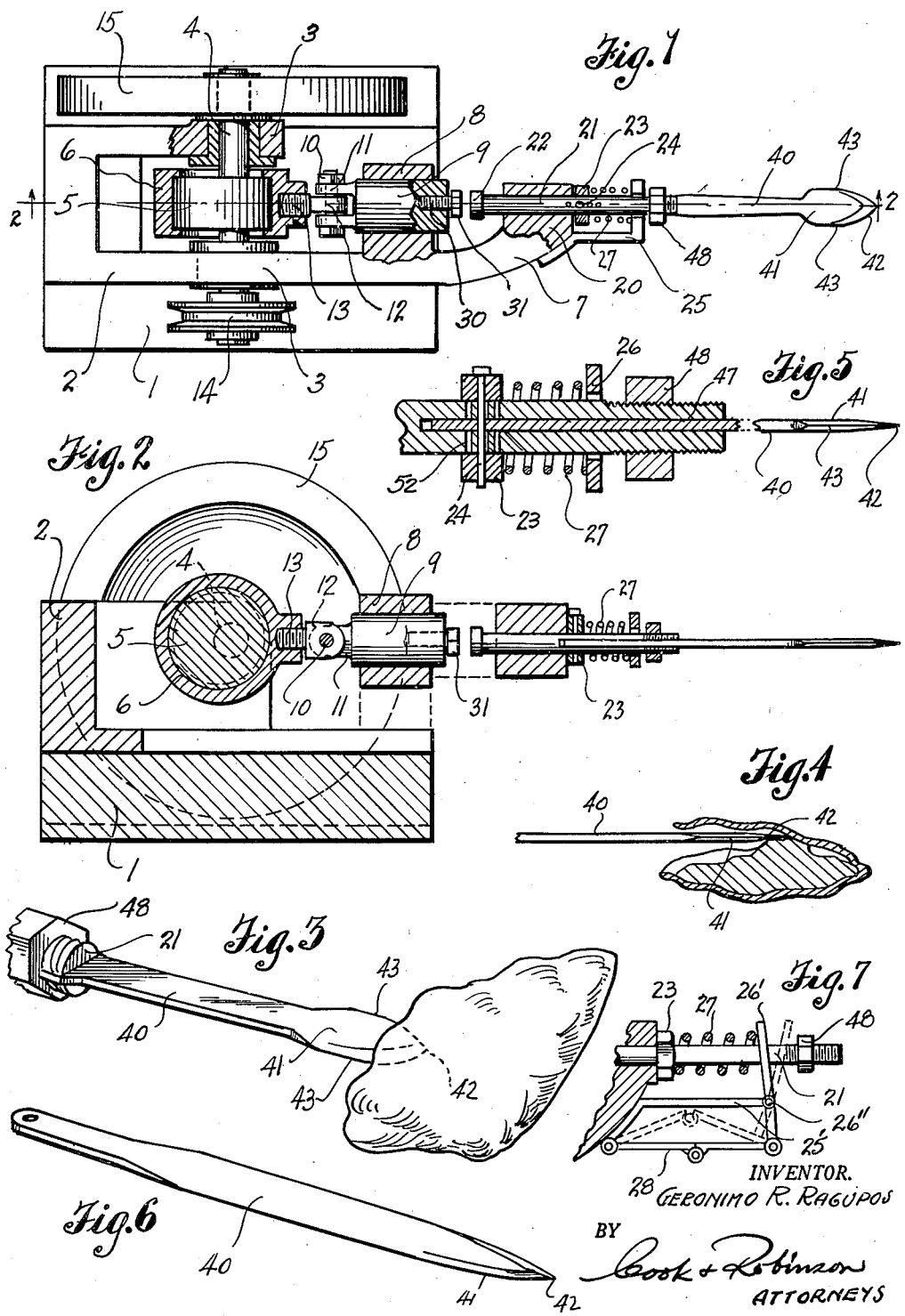

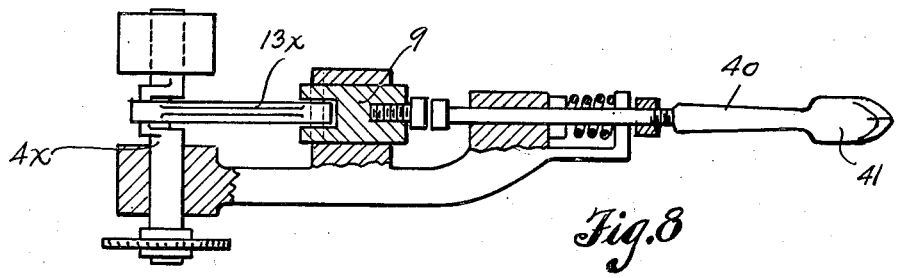
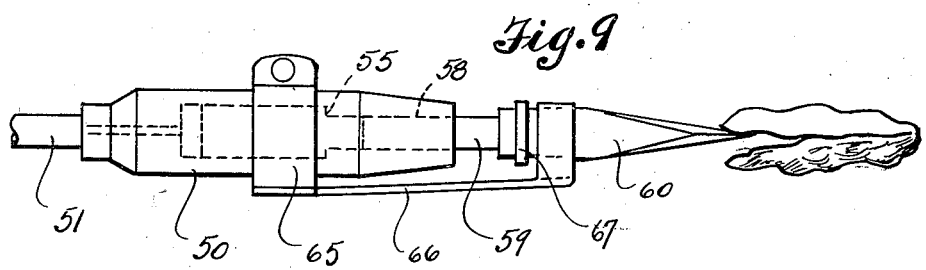

2,391,739

UNITED STATES PATENT OFFICE 2,391,739

OYSTER OPENING MACHINE

Geronimo R. Ragupos, Spokane, Wash.

Application April 29, 1944, Serial No. 533,275

4 Claims. (Cl. 17—9)

This invention relates to improvements in means for the opening of oysters, and the like, and it has for its principal object to provide a mechanically powered device designed to be employed, first, for the opening of the oyster shell, then for cutting the muscle that holds the half shells so that they may be opened apart, and finally for cutting the meat from the shell.

More specifically stated, the present invention resides in the provision of an oyster opening mechanism that is characterized by a tool to which an endwise vibration is imparted by impingements of a reciprocating hammer so that by merely pressing the shell of the unopened oyster against the pointed or sharpened end of the tool, the shell will be quickly and readily penetrated by the blade of the tool, thus enabling the operator, by manipulation of the oyster as held in the hand, to use the blade of the tool as a pry whereby the opposite side sections of the shell may be sprung apart, and the muscle cut free from one half of the shell, thereby permitting the shells to be separated and the meat removed.

This invention is a continuation in part of my copending application, Serial No. 476,397, which has issued as Patent No. 2,354,928, dated August 1, 1944.

It is also an object of this invention to provide a machine of the kind and for the purposes above stated wherein the hammer element has a definite and positive reciprocal action and wherein the shell opening tool is actuated thereby with a comparatively short stroke that enables the blade or point of the tool to be readily piloted or guided into the joint between the half sections of the oyster shell and permits the cutting of the muscle and meat without chipping or driving through the shell.

Still further objects of the invention are to be found in the details of construction of the various parts of the machine, in the combination of hammer and tool, in their functional relationship and their mode of use, as will hereinafter be fully described.

In accomplishing the above and other objects of this invention, I have provided the improved details of construction, the preferred forms of which are illustrated in the accompanying drawings, wherein—

Fig. 1 is a plan, or top view of the present oyster opening machine; parts thereof being broken away and shown in section for clearer understanding.

Fig. 2 is a horizontal section of the machine taken on the line 2—2 in Fig. 1.

Fig. 3 is a perspective view of the oyster opening tool illustrating the manner in which an unopened oyster shell is applied thereof for opening and for cutting the muscle to free the half shells for opening apart.

Fig. 4 is a sectional detail of an oyster, indicating the use of the tool in the cutting of the muscle from the shell.

Fig. 5 is a sectional detail showing the manner in which the tool is fixed to its mounting side.

Fig. 6 is a perspective view of a shell entering tool of an alternative form.

Fig. 7 is a detail of the spring tensioning means.

Fig. 8 is a plan view, with parts in section, of an alternative type of machine.

Fig. 9 illustrates still another type of machine which is in the nature of an attachment for an air hammer.

Referring more in detail to the drawings: The machine of Fig. 1, embodied by this invention, comprises a supporting base portion that is designated by reference numeral 1, and on which base the frame structure 2 of the machine is fixed. This frame, preferably of metal, includes the horizontally alined bearings 3—3 in which a transverse shaft 4 is rotatably mounted. The bearings 3—3 are spaced apart, and mounted on the shaft 4 between these bearings, either as an integral part of the shaft, or as a member keyed or otherwise fixed thereto, is an eccentric journal 5 about which a collar 6 is rotatably fitted and secured.

The frame structure has a forwardly directed horizontal arm designated by reference numeral 7 and formed on this arm, in alinement with the plane of rotation of the eccentric, is a bearing 8 in which a hammer element 9 is reciprocally contained; the hammer being connected at its inner end to the collar 6 by means of a pivot bolt 10 that extends through ears 11—11 on the hammer end, and pivotally through the head portion 12 of a bolt 13 that is threaded into the collar as will be understood best by reference to Figs. 1 and 2. The parts are so joined that rotation of the shaft 4 causes the eccentric journal 5 to effect reciprocal action of the hammer in bearing 8.

The shaft 4 is equipped at one end with a belt wheel 14 whereby it may be rotatably driven, and at its other end, it mounts a fly wheel 15 thereon to insure steady action of the hammer. It is to be understood, however, that various means might be provided for reciprocating the hammer.

For example, the shaft 4 might have direct connection with a motor driven shaft or might be operated through a geared connection with various types of driving machines. Also, it might be desirable in some instances, in view of the drive employed, to omit the use of the flywheel.

At the end of the forwardly extending arm portion 7 of the frame, beyond the bearing 8 which supports and guides the hammer, is a guide bearing 20, and reciprocally mounted therein, in axial coincidence with the axial line of the hammer, is a slide 21. Preferably this slide is a round rod, and at its inner end, adjacent the hammer, is formed with a head 22 and at the other end, at the outside of the bearing 20, a stop or nut 23 is fixed thereon by a pin 24 that is extended through the nut and a hole in the slide. As will be noted by reference to Figs. 1 and 2, there is a bracket 25 fixed to the extending arm 7 of the frame, and this is extended along the outer end portion of the slide and at its end, has a laterally turned leg 26, with an opening therein through which the slide freely operates. A coiled spring 27 is disposed under compression between the leg 26 and the nut 23, and this operates to yieldingly hold and move the slide to its inner limit of travel as determined by the location thereon of the nut 23.

In Fig. 7, I show means whereby the spring pressure may be released when such is desired, and held under compression only when such is more practical. For this purpose, I have provided a lever 26' with a hole in one end through which stem 21 extends with clearance. This lever is hinged by a pivot 26'' on a bracket 25' that is fixed to the frame, and a hinged toggle lever 28 connects the outer end of the lever 26' with the base of the bracket. When the toggle is straightened out, as in Fig. 7, it operates to move the lever 26' to a position for placing the spring 27 under compression. When the toggle is broken, as seen in dotted lines in Fig. 7, compression is relieved from the spring and it will not operate to return the slide for contact by the hammer. Then the slide will be impinged by the hammer only when it is pushed inwardly; for example, by placing an oyster shell against the end of the knife and pushing inwardly. This provides for limiting the chopping action of the chisel to any extent desired.

It will be observed that a bolt 30 is adjustably threaded into the outer end of the hammer and this has a wear head portion 31 that is adapted, incident to reciprocation of the hammer, to engage with the head of the slide when the hammer is driven outwardly. It is desirable that the inward travel of the slide, when the spring is under compression, be so determined by the position of the nut 23 thereon, that the hammer blow will strike the slide during the latter part of the outward reciprocal travel of the hammer. In other words, while the hammer stroke preferably is approximately one-half inch, the slide movement is only approximately $\frac{3}{16}$ of an inch and is effected by the hammer on the latter part of its outward stroke. When the hammer retracts, the spring 27, if compressed, causes the slide to follow back until stopped by the nut 23. Thus the stroke of the slide is comparatively short and in view of the high rate of reciprocation of the hammer, it is more in the nature of a vibration.

Mounted on the outer end of the slide, as a continuation thereof, is the oyster opening tool of chisel-like nature, which, as illustrated best in Fig. 3, comprises an elongated shank 40 formed at its forward end with a symmetrically widened blade 41 terminating in a sharpened point 42. Also, the opposite side edges of the blade are sharpened as at 43. The shank of the tool at its inner or mounting end, is somewhat tapered to bring it down to a width equal to the diameter of the slide bar, and this mounting portion is adapted to fit within a longitudinal slot 47 that is formed in the outer end portion of the slide. To hold the tool, a nut 48 is threaded onto the outer end portion of the slide, and may be tightened against the tapering side edges of the shank to hold it rigidly mounted. Furthermore, there is a hole 49 through the inner end of the mounting portion which receives the pin 24 which secures the nut 23 on the slide, and this, together with the nut 48, holds the tool perfectly rigid relative to the slide.

Assuming that the shaft 4 is being driven, and that the hammer is being reciprocated at the desired speed, the use of the machine for opening an oyster is as follows:

First, the toggle is adjusted to release the spring tension, then the oyster, held in hand by the workman so that the joint between the half shells is toward the sharpened end of the blade, as indicated by the showing of the oyster in Fig. 3, is caused to engage the point of the blade and the blade and slide thereby shifted inwardly a slight distance. As the blade vibrates under the impinging action of the hammer, it is apparent that the chopping action that results will cause the blade to cut through and to enter the shell. The extent of reciprocation of the blade is determined by the pressure applied against it and position in which the oyster is held. The maximum reciprocation is determined by the setting of nut 23. To provide for setting the nut 23 to allow shorter or longer vibrating action of the blade, the slide may have a series of holes 52 therein to receive the pin 24 as noted in Fig. 5. After the blade has once entered the shell, the operator, by manipulation of the toggle, places the spring under compression so that the blade will have its full stroke. In some instances, it may be desirable to retain the spring under compression at all times. After the blade has once cut through the shell, then the shell may be manipulated in a manner whereby the blade can be made to cut the muscle free from the shell. This action has been illustrated in Fig. 4. Then, after the muscle has been cut, the tool shank may be used as a pry whereby to open or separate the two half sections of the shell.

While it is possible to use the tool, after the top shell has been removed, as a means of cutting the meat from the lower half shell, it has been found desirable in some cases merely to deliver the lower half shell with the meat therein to other operators who, by use of the special knife, can remove the meat more expeditiously than can be accomplished by this tool.

In some instances, it is desirable that the meat be retained in the half shell and be served in that manner.

In Fig. 6, I have illustrated a modified form of tool which has a longer and more pointed blade for entering the shell. This has been found to be more practical for some of the larger kinds of oysters. However, its use and its functions are substantially the same as those described with reference to the device shown in Fig. 3.

In Fig. 8, I have illustrated an alternative type of machine for oyster opening, which is substantially the same as that of Fig. 1 in all parts except the means for reciprocating the hammer. In this device, the hammer body 9 is connected by a link 13x with a crank shaft 4x which is revolubly supported in the bearings 3—3 and which is equipped at one end with a sprocket wheel whereby it may be driven.

The tool of Fig. 9 comprises a common type of air hammer having a cylindrical body portion 50 which is supplied with air under pressure through the hose 51; this hose, as here shown, connecting with one end of the body. Reciprocally contained in the body 50 is a hammer 55 with limited endwise movement. This hammer is caused to be reciprocated by the air pressure in a manner well known and not herein described. At the end of the body 50 opposite that to which the air hose connects, is an axial bore 58 in which the shank 59 of a chisel-like tool 60 is reciprocally fitted. Applied about the body of the air hammer is a clamp 65 equipped with an arm 66 that extends beyond the forward end of the body where it has a forked end loosely embracing the tool shank. The tool is equipped with a collar 67 which will engage the fork to limit its outward endwise movement. The end of the tool is sharpened in a manner corresponding to the sharpened end of the tool 40. This is used in a manner like that described in connection with the device of Fig. 3. The oyster to be opened is pressed against the sharpened end of the tool, first to move the tool endwise to a position at which its inner end is brought into the limits of reciprocal travel of the hammer 55, and it is thereby caused to chisel its way into the shell of the oyster. The end of the tool in this instance would preferably be applied along the seam or joint of the bivalve.

Machines of the character heretofore described have been in use and have proven to be very practical and it has been demonstrated that ordinary unskilled labor can, by its use, exceed the output of oysters opened by hand by those who have long been experienced in the work.

The great success of such machines is thought to be due to the fact that the slide which mounts the tool or knife is not directly connected to the hammer, but is free, and while it receives the blows of a hammer that reciprocates through an extended travel, the knife has a relatively short action that makes it easy to pilot into the shell. Manifestly, long travel of the blade would be too violent and would gouge and chop the oyster shell, where the short vibratory action is easy to apply.

It is readily apparent that details of construction of the various machines shown might be varied without departing from the spirit of the invention. Therefore it is not desired that the claims shall be restricted to details of construction, but that they be given an interpretation that is commensurate with the scope of the invention herein disclosed.

It has been found that it is not essential that the point of the opening tool be applied to the joint between the closed edges of the half shells, but it may be just as well applied directly against the side of the oyster near the seam, as its action will be to cut through the shell to obtain the same results as are accomplished by the blade entering between the half shells at the seam.

Also, it is to be understood that the position of the machine may be changed to best accommodate the worker. In other words, the tool may extend horizontally, or it may extend vertically. It is anticipated that in an establishment using several of these machines, as of Fig. 9, they would be arranged in alinement with the reciprocating blade extended horizontally and all of the machines operatively connected with a line shaft. However, this is optional to the user.

Having thus described my invention, what I claim as new therein and desire to secure by Letters Patent is:

1. In an oyster opening machine, a slide mounted for limited endwise movement, a spring disposed to act against the slide to return it from an extended to its retracted position, means for placing the spring under compression or for releasing the compression, a reciprocally operable hammer positioned to deliver impinging blows against the inner end of the slide, means for reciprocating the hammer, and a chisel-like tool mounted at the outer end of the slide to engage with the oyster to be opened.

2. An oyster opening machine comprising a frame, a drive shaft rotatable therein, a hammer element reciprocally mounted in the frame having an eccentric crank connection with the shaft whereby the hammer will be reciprocally actuated, a guide bearing in the frame, a slide bar mounted in the bearing in alinement with the hammer movement, to be impinged at its inner end by the hammer during its outward travel, a stop adjustably fixed on the slide to engage the guide bearing to determine the limit of inward travel of the slide, a stop on the inner end of the slide to limit its outward travel, a lever pivotally supported on the frame, a spring interposed between one end of the lever and stop adapted to be placed thereby under compression to urge the slide inwardly; and a chisel-like tool mounted by the slide at its outer end and against which an oyster may be engaged for opening, and whereby the slide may be moved inwardly for impingement by the hammer.

3. A machine as in claim 2 wherein a toggle link is connected with said lever whereby the latter may be moved to and held at a position for holding the spring under compression whereby to return the slide to its full limit of inward travel.

4. An oyster opening machine comprising a frame, a slide bar mounted in the frame for limited endwise reciprocal travel in opposite directions, and having a striking head at its inner end, a chisel-like tool mounted at the outer end of the slide and comprising an elongated shank portion aligned with the slide and formed at its outer end with a flattened and pointed blade, a spring in the frame acting against the slide to urge it inwardly, a hammer member reciprocally mounted in the frame in alignment with the slide and having limited movement in its striking direction, an impact member mounted in the hammer to engage the striking head of the slide and adjustable in the hammer to impart more or less endwise movement to the slide with each impact of the hammer.

GERONIMO R. RAGUPOS.